United States Patent [19]

Ward et al.

[11] Patent Number: 5,542,097
[45] Date of Patent: Jul. 30, 1996

[54] METHOD AND SYSTEM FOR CONFIRMING THE IDENTITY OF A TARGET CELL FOR HANDOFF

[75] Inventors: Torbjörn Ward, Montreal, Canada; Norio Iizuka, Stockholm, Sweden

[73] Assignee: Telefonaktiebolaget LM Ericsson, Stockholm, Sweden

[21] Appl. No.: 394,266

[22] Filed: Feb. 22, 1995

[30]  Foreign Application Priority Data

May 16, 1994 [SE] Sweden .................................. 9401713

[51] Int. Cl.⁶ ............................................ H04Q 7/00
[52] U.S. Cl. ...................... 455/33.2; 455/33.1; 455/54.1; 455/56.1; 379/60
[58] Field of Search .............................. 455/33.1, 33.2, 455/34.1, 34.2, 33.4, 54.1, 54.2, 56.1, 67.3; 379/59, 60, 58

[56]  References Cited

U.S. PATENT DOCUMENTS

| | | | |
|---|---|---|---|
| 4,670,906 | 6/1987 | Thro | 455/56 |
| 4,696,027 | 9/1987 | Bonta | 379/60 |
| 5,170,485 | 12/1992 | Levine et al. | 455/33.2 |
| 5,203,010 | 4/1993 | Felix et al. | 455/33.2 |
| 5,239,667 | 8/1993 | Kanai | 455/10 |
| 5,257,408 | 10/1993 | Olson et al. | 455/67.6 |
| 5,276,906 | 1/1994 | Felix | 455/33.2 |
| 5,285,447 | 2/1994 | Hulsebosch | 370/69.1 |
| 5,287,544 | 2/1994 | Menich et al. | 455/33.1 |
| 5,293,643 | 3/1994 | Israelsson | 455/33.2 |
| 5,355,515 | 10/1994 | Sicher | 455/33.2 |
| 5,375,123 | 12/1994 | Andersson et al. | 370/95.1 |
| 5,379,446 | 1/1995 | Murase | 455/33.2 |
| 5,390,539 | 2/1995 | Bruckert et al. | 455/33.2 |
| 5,396,647 | 3/1995 | Thompson et al. | 455/33.2 |
| 5,422,933 | 6/1995 | Barnett et al. | 379/60 |

FOREIGN PATENT DOCUMENTS

| | | |
|---|---|---|
| 256234 | 10/1989 | Japan . |
| WO91/17608 | 11/1991 | WIPO . |
| WO92/06543 | 4/1992 | WIPO . |
| WO93/08655 | 4/1993 | WIPO . |

OTHER PUBLICATIONS

*International Search Report* [PCT/SE95/00490] Date of mailing: 1 Nov. 1995.

*Primary Examiner*—Andrew Faile
*Assistant Examiner*—Lee Nguyen
*Attorney, Agent, or Firm*—Burns, Doane, Swecker & Mathis, L.L.P.

[57]  ABSTRACT

A digital radiocommunication system and method for providing a consistency check to confirm the identity of a candidate cell for handoff of a digital traffic channel are described. Using relative pathloss comparisons reliance on absolute measurements which can lead to inappropriate handoffs for a variety of reasons. Statistical measurements can also be used to further reduce errors.

8 Claims, 3 Drawing Sheets

DELTA(p) = DELTA (SS)

METHOD AND SYSTEM FOR CONFIRMING THE IDENTITY OF A TARGET CELL FOR HANDOFF

The present invention generally relates to radiocommunications and, more particularly, to radiocommunication methods and systems in which handoffs are implemented from digital traffic channels using mobile-assisted handoff (MAHO).

Mobile stations connected to base stations on voice channels are sometimes handed off to an inappropriate cell, which may result in poor voice quality or even a dropped call. It has been found that inappropriate handoffs frequently occur due to the way signal strength, measured during the MAHO process, is identified with a neighboring cell. For example, although a mobile station may measure a signal's strength during MAHO correctly, the measured signal may originate from a cell other than the neighboring cell which was intended to be measured, i.e., the measured signal may originate from a co-channel cell of the neighbor cell.

This means that the mobile's MAHO-measurements are inaccurate in the sense that a signal strength is measured on a measurement channel frequency which indicates a signal coverage that, in reality, is different from the actual coverage currently provided by the neighboring cell. This inaccurate value is reported to the base station, and then incorrectly interpreted as the signal strength on the measurement channel in the neighboring cell.

The locating function in the base station may then believe that the neighboring cell will provide better signal strength for the mobile station than its current connection, and a handoff will be attempted to the candidate cell if a subsequent check, known as the Mobile Station Presence Verification, is successful. When this function is invoked, the candidate base station, i.e., the base station of the neighboring cell to which the call is to be handed off, is requested to tune to the current channel, synchronize to the correct time slot and decode the Digital Verification Color Code (DVCC) transmitted by the mobile station in all bursts of an ongoing call. The DVCC is a field known to the receiver that indicates which group of cells a particular transmission is associated with, thereby identifying the mobile station to be handed off.

This function attempts to decode the DVCC for up to five bursts. When three correctly decoded DVCC bursts out of five have been detected, the verification is discontinued and a verification result is returned to the mobile station controller (MSC) with information about the success and the average signal strength during the verification process. If three or more incorrectly decoded DVCC's are received, the verification is discontinued and a failure indication is returned. The reason for incorrect DVCC decoding may, for example, be that the mobile is too far away from the source so that the signal strength is too low, or that there is severe cochannel disturbance on the channel preventing the DVCC from being decoded successfully. Upon receiving the verification results from the candidate cell, the signal strength is evaluated. The verification is only regarded as successful if the signal strength during verification is greater than (or equal to) the minimum signal strength for handoff into the cell.

However, this evaluation has the drawback that a system operator must manually tune the signal strength threshold to the lowest acceptable value, because there is only one such threshold for handoffs from all other cells into a particular cell, i.e., there is not a unique threshold for each handoff situation. This conventional technique is relatively inflexible since there are situations where it would be desirable to set the threshold differently for handoffs from different cells. For example, such flexibility is desirable where there is a difference in cell sizes of the neighboring cells.

Other problems also exist in conventional systems. Measurement errors and systematic device (bias) errors, due to different mobile terminal suppliers, significantly influence verifications and cause a number of incorrect handoff decisions. For example, mobile stations and, to a lesser extent, base stations exhibit bias errors in the power setting devices and signal strength measurement devices. Another problem with conventional systems is that they fail to take into account variations in signal strength measurements in the period preceding the point in time when the measurement is taken.

SUMMARY

These and other drawbacks and problems associated with conventional systems are overcome according to the present invention wherein a consistency check can be performed to detect when a candidate cell has been erroneously designated as the best candidate, and Upon such detection the handoff can be prevented. The consistency check can be, for example, made in the mobile services switching centre (MSC) by comparing signal strengths measured by the mobile and base station in the serving cell collected during locating, with the signal strength measured during the verification in the target cell.

According to exemplary embodiments, the consistency check can be based on relative measurements rather than absolute signal strength thresholds so that the consistency check criteria provide greater flexibility to accommodate the various situations in every cell relation. An advantage of this scheme is that there is no comparison to an absolute threshold, i.e. the consistency is checked for varying situations, taking into account the current radio environment characteristics.

Moreover, multiple measurements can be taken on the uplink and downlink between the mobile station and the serving base station to arrive at an estimate of the bias error for the mobile station of interest. This estimate can be used to improve the accuracy of the consistency check by applying a corresponding correction.

BRIEF DESCRIPTION OF THE DRAWINGS

The foregoing, and other, objects, features and advantages of the present invention will be more readily understood upon reading the following derailed description in conjunction with the drawings in which.

DETAILED DESCRIPTION

Figure 1:
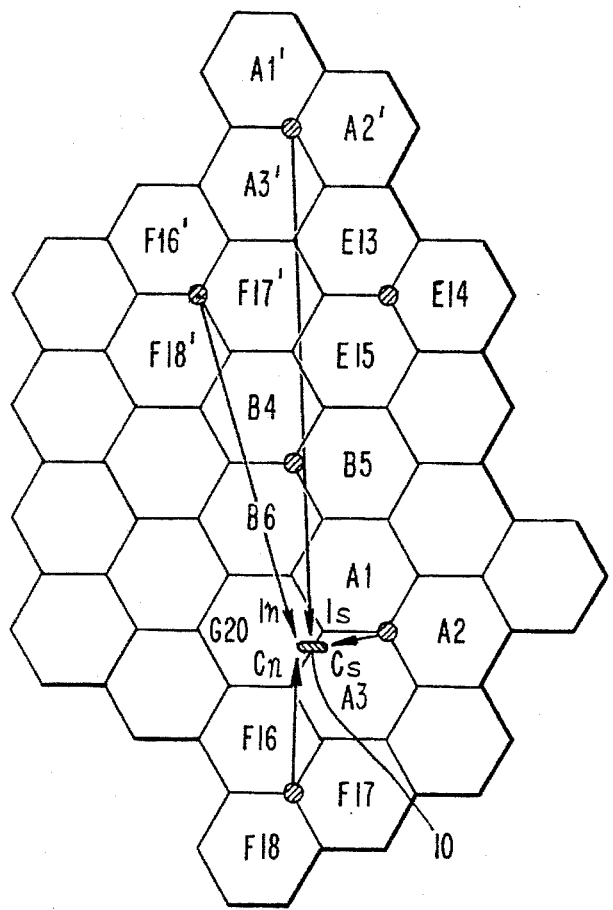
FIG. 1 illustrates a hypothetical cell layout with vector representations of inverse signal strength.

Prior to describing consistency checking according to the present invention, a more detailed explanation of one of its precursors, termed "digital locating" herein, is provided for complete understanding of the problems solved by the present invention. Digital locating is a process performed in the serving base station that receives MAHO-measurements from the mobile, averages the received signal strength values and periodically ranks the neighboring cells in order of received signal strength, for example, once a second. As soon as one or several neighbors are ranked higher than the cell which is currently serving the mobile, the MSC is provided with a ranked candidate list of target cells that are believed to be better servers, together with a handoff request. Exemplary cell parameters for coordinating digital locating in the base station include:

Signal Strength Hysteresis. The hysteresis is a penalty, and reflects the amount (e.g., in dB) that the signal strength in the neighboring cell shall be better than that of the serving cell before a handoff is attempted. This parameter is used to prevent oscillating handoffs and can also be used to move a cell border from the point of equal signal strength.

Neighboring Cell. Up to, for example, twelve cells can be defined as neighbors to a digital cell. In hierarchical cell structures where overlapping cells are provided, neighboring cells can include macrocells, microcells, picocells, etc. Neighboring cells are those cells that the mobile is allowed to be handed off to.

Power Setting-Voice Channel Base-Station (PSVB). This parameter reflects the output power of the voice channels (traffic channels) in the base station.

Power Setting-Measurement Channel-Base Station (PSMB). This parameter reflects the output power on the measurement channel. If there is a difference in output power of voice channels and measurement channels (control channels), this is reflected in a difference between PSVB and PSMB.

Reaction Time. Controls the number of seconds a neighboring cell is better than the serving cell (including hysteresis) before sending a handoff request to the MSC.

Signal Strength Minimum (SSMIN). Defines the minimum signal strength of a neighboring cell in order to be qualified for ranking (downlink signal strength, as measured by the mobile during MAHO).

Measurement Channel Number (MCHNR). This parameter reflects the channel number of a cell's measurement channel (control channel). The neighboring cells' MCHNRs are forwarded to the mobile station in the initial phase of the call setup on a digital voice channel.

The expected downlink received signal strength is the signal strength that the mobile is expected to receive after a handoff. Simply put, it is the signal strength the mobile has measured on the neighboring measurement channel during the MAHO-process, adjusted to account for any differences in measurement channel and voice channel power setting in the neighboring cell. The neighbor cells that fulfill the condition that the expected received signal strength after handoff is greater than the preset minimum signal strength for handoff (SSMIN) are qualified for ranking. The ranking of neighbors is based on the expected received signal strength, with a penalty equal to the hysteresis. Neighbors (one or several) are regarded as handoff candidates if they have been ranked higher than the current cell for more than a predetermined time period, e.g., between 1 and 31 seconds. The handoff request is sent to the MSC and includes those neighbors fulfilling this criteria.

Inappropriate handoffs are often caused by incorrect MAHO-measurements, as described above. An incorrect MAHO-measurement normally occurs when a mobile receives another control channel in the system which is transmitting on the same frequency as, and at a greater signal strength than, the control channel from the targeted neighboring cell during the MAHO measurement process. The reason for receiving another control channel stronger than the control channel from the intended neighboring cell varies. For example, this can be the result of a tight (geographically) frequency reuse plan, or that the mobile has left the serving cell without being handed off because of congestion in other neighboring cells. This phenomenon can also be caused by directed retry when there is congestion in the cell for call setup, where the mobile by definition will be connected to a cell that is not the best server, and thereby the mobile is closer to the cochannel control channels of the neighboring cells. The problems with incorrect MAHO-measurements will increase with tighter frequency reuse, unexpected radio propagations (as in hilly terrain), low antenna positions (which gives diffuse radio coverage), etc. Moreover other radio phenomena such as, adjacent channel interference, radio noise, and intermodulation products, that have energy within the frequency being measured will have the same adverse effect on MAHO-measurements as cochannel interference.

Currently, the only known mechanism for avoiding inappropriate handoff is the MS Presence Verification scheme described above. Although it was previously 15 believed that this verification would be successful only if the target cell is the correct cell, the verification has been found in practice to be unreliable. An exemplary application in which the MS Presence Verification has proven unreliable is radiocommunication in metropolitan areas, many of which have cell geographies in which the distance between cell sites is small, frequently on the order of 1 mile or less. In such cell geographies, the target cell can normally detect and decode the DVCC successfully from any nearby cell, even from the co-channel cells despite their greater distance from the mobile than the neighboring cell which is intended to be measured, thus providing false positive verifications.

Another consideration that conventional systems fail to account for is that, statistically, the carrier-to-interference (C/I) ratio on the measurement channels are lower than on the voice channels. This consideration will be illustrated graphically using FIG. 1. Therein, an exemplary difference between C/I on the voice channel and C/I on the measurement channel is shown for a typical 7/21 cell plan.

The mobile 10 is connected to cell (A3), and is moving westbound towards cell (G20). Cell (F17) is one of the neighboring cells of cell (A3). The vectors in FIG. 1 represent exemplary carrier and interference magnitudes (with shorter vectors denoting lesser distance and therefore greater magnitude) and directions, each of which is described below.

Cs is the vector representing the carder level in the serving cell (A3) and Is the vector representing the interference level from the cochannel cell (A3'). Cn is the vector representing the carrier level from a neighboring cell (F17). In is the vector representing the interference level from the cochannel cell to the neighboring cell (F17').

Cs/Is is the C/I on the voice channel and Cn/In is the C/I on the measurement channel. It can be seen in FIG. 1 by comparing the vector lengths, that even in a theoretically regular 7/21 cell plan the C/I on the measurement channel is clearly lower than on the voice channel, i.e., since Cs>Cn and In>Is, then Cs/Is>Cn/Is.

Therefore, in a practical situation with different cell sizes, radio propagation differences, terrain and building dependencies etc, the C/I on the measurement channel may become so poor that it corrupts the MAHO measurements. It should also be noted that if the mobile is dragging the handoff, i.e., if the mobile is still connected to a server after it has left the cell associated with that server, the risk of low C/I on the measurement channel increases. Reasons for dragging handoffs include, for example, congestion, poor coverage, a large hysteresis value, etc.

According to exemplary embodiments of the present invention, a consistency check is based on relative measurements, e.g., pathloss comparisons, instead of the comparison of one absolute measurement made in the target base station with a threshold. Of course, even when performing relative measurements the absolute measurements of signal strength and power levels should be as accurate as possible since they affect the relative result. However, by primarily relying on the more accurate signal strengths generated by the serving and target base stations, decisions are streamlined since the relatively less accurate signal strength generated by the mobile being considered for handoff is used in both pathloss calculations (mobile to serving base station and mobile to target base station). The inventive consistency check also provides protection against the various bias errors inherent in the power measurement equipment of mobile stations, since such bias errors should cancel one another out.

Thus, consistency checks according to the present invention are performed by comparing the difference in downlink pathloss between the serving cell and the target or candidate cell, with the difference in uplink pathloss between the serving cell and the candidate cell, within some predetermined margins which account for potential measurement inaccuracy. Before the system believes that a neighboring cell is a better server for the mobile, the system performs a consistency check according to the present invention, for example, after a conventional verification is performed. That is, the measured signal strengths are reported to the MSC, and then the MSC performs a consistency check according to the present invention.

Prior to describing exemplary methods which can be used to implement consistency checks according to exemplary embodiments of the present invention, various uplink and downlink signal relationships are discussed with respect to FIGS. 2–5 in order to promote a complete understanding of the present invention.

Figure 2:
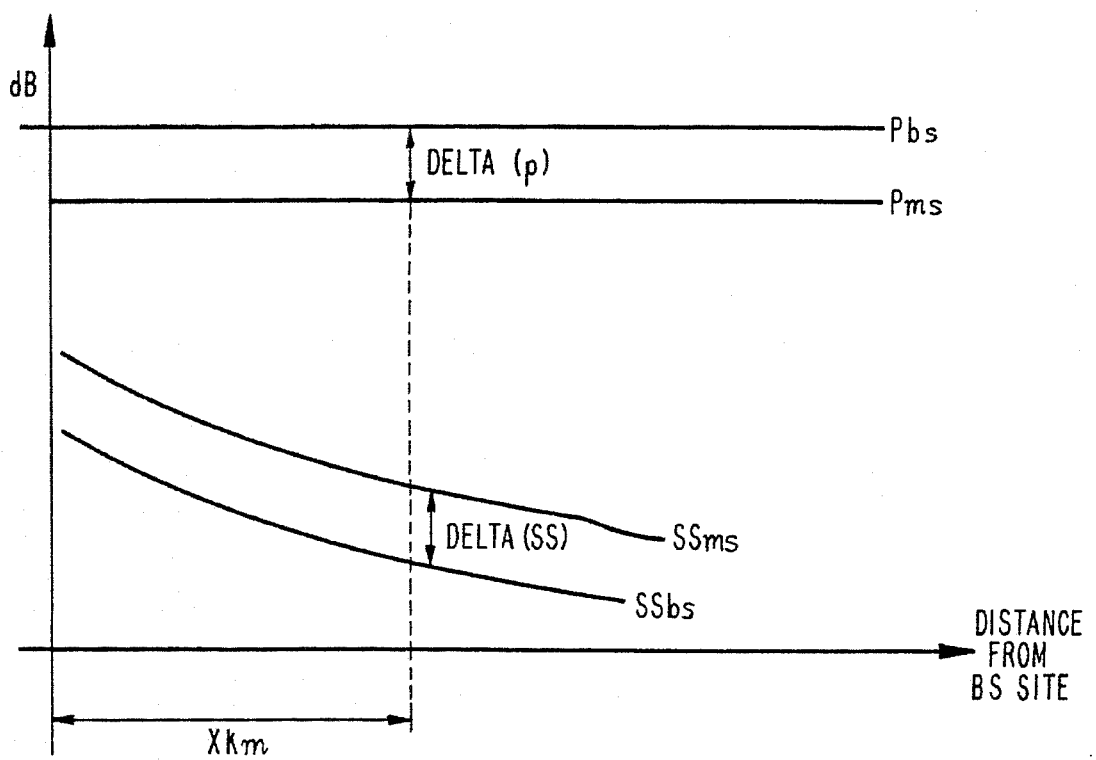
FIG. 2 illustrates path loss and transmitted and received signal strength levels on the uplink and downlink for a serving and target base station and a mobile station at a varying distance X.

FIG. 2 illustrates transmitted and received signal strength levels (uplink and downlink) for a base station and a mobile station at a varying distance X. The power level Pbs at which a base station transmits is normally constant. To illustrate the present invention in a pedagogical manner, it has been assumed in FIG. 2, that the mobile station sends at a constant level Pms which is independent of distance from the base station. However, those skilled in the art will appreciate that the power level Pms, at which the mobile station transmits, normally varies depending on its distance from the base station in accordance with power adjusting orders from the base station. FIG. 2 illustrates an interesting concept recognized by Applicants, i.e., that the difference in transmit power levels (Delta(p)) is equal to the difference in receive power levels (Delta (SS)) provided that there are no transmit level errors or measurement errors.

Figure 3:
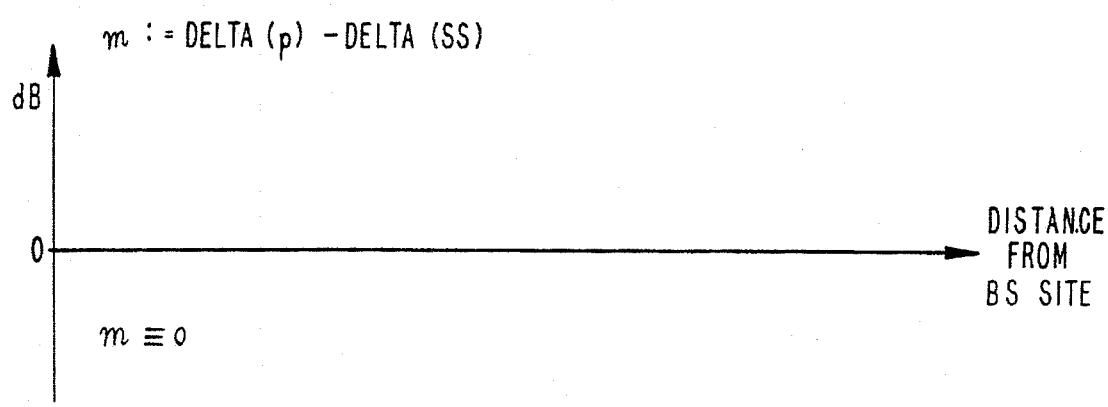
FIG. 3 illustrates that a difference between transmitted signal strength levels of a base station and a mobile station and a difference between received signal strength level at that base and mobile station are theoretically equal.

FIG. 3 illustrates the same concept in a different way, i.e., that the difference between transmit signal strength levels on one side and received signal strength levels on the other side are theoretically equal and their difference Delta(p)–Delta(SS)=0. The variable "m" is used herein to denote this difference.

Figure 4:
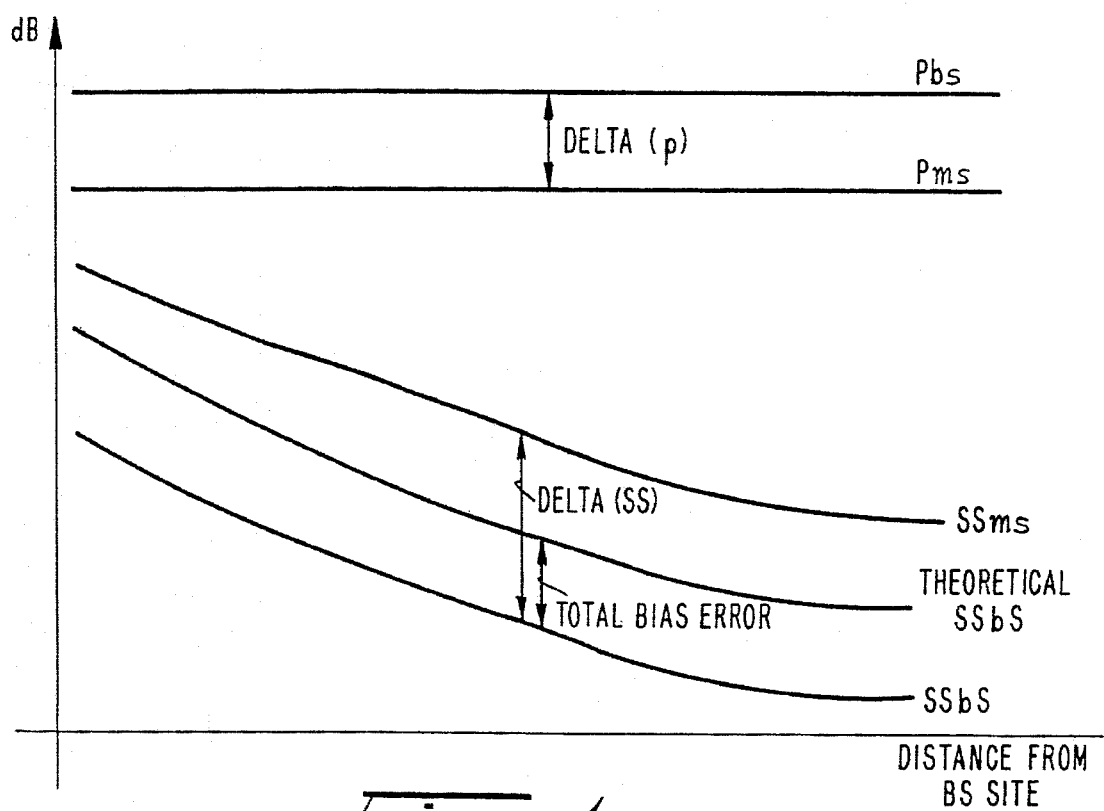
FIG. 4 illustrates that an exemplary total bias error for any point X is equal to a measured difference Delta(p)–Delta(SS)

FIG. 4, on the other hand, illustrates that deviations (e.g., total bias error) from the theoretical value of zero are due to transmission level inaccuracies and measurement errors attributable to the equipment. In the base stations the accuracy of power setting and measuring equipment is generally better than the accuracy of similar equipment in mobile stations. Assuming that any errors are caused only by the mobiles, the total bias error shown in FIG. 4 may be calculated from the sending levels and the measurements in the serving base station itself and in the mobile station. This calculated total bias error may then be used to provide a correction in the consistency check as will be discussed below.

Figure 5:
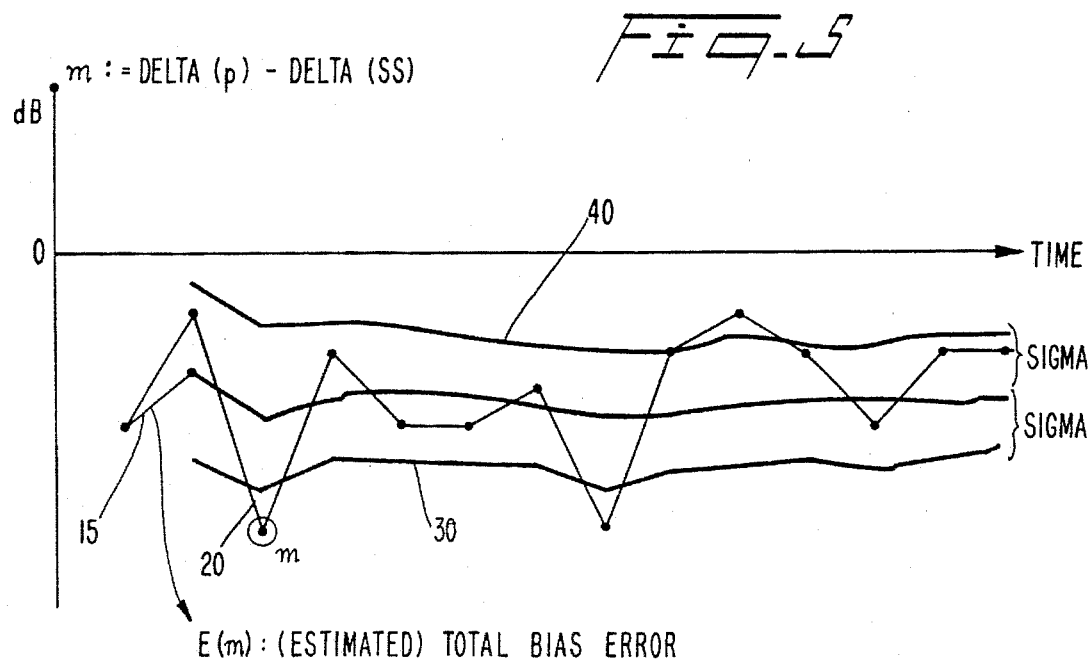
FIG. 5 illustrates exemplary total bias error values m, filtered total bias error values E(m) and standard deviations as functions of time.

FIG. 5 illustrates the total bias error values m 20 and the filtered total bias error values E(m) 15 as a function of time. Also, the standard deviation, sigma (m) 30 and 40, is shown as a function of time. The error m=Delta(p)–Delta(SS) varies with time and is filtered over time using, for example, the well known Kalman filtering method. A smooth curve as a function of time is then obtained for the total bias error estimate. This filtered value provides a more reliable error measurement as compared with the uplink measurements made by the target base station during the conventional MS presence verification which are more uncertain because the time over which they are averaged is shorter.

Figure 6:
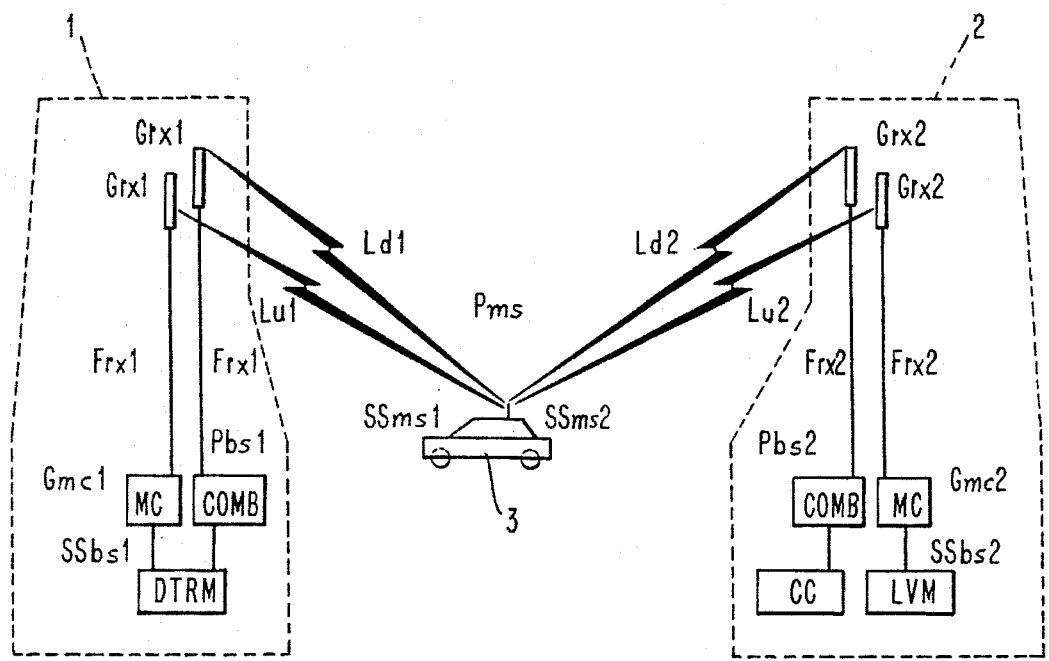
FIG. 6 depicts power considerations for a serving and target base station which are used to describe exemplary consistency checks according to the present invention.

An exemplary method for performing a consistency check according to the present invention is derived from FIG. 6. In FIG. 6, base station 1 is the serving or current cell and base station 2 is the target cell which has been identified by the digital locating function as the best candidate for the hand off of mobile station 3. The labels illustrated in FIG. 6 represent the following parameters:

MC: Multicoupler (input from antenna to several receivers).

COMB: Combiner (output to antenna from several transmitters).

DTRM: Digital Transceiver Module (sending and receiving).

CC: Control Channel.

LVM: Location and Verification module (to measure the signal sent from mobile stations).

Pms: Power transmitted by the mobile station.

SSms1: Signal strength measured by the mobile from base station 1 (on current (serving) voice channel).

SSms2: Signal strength measured by the mobile from base station 2 (on the measurement channel).

SSbs1: Signal strength measured by base station 1 from the mobile.

SSbs2: Signal strength measured by base station 2 from the mobile.

Pbs1: Power transmitted by base station 1.

Pbs2: Power transmitted by base station 2.

Gtx1/2: Transmit antenna gain at base stations 1 and 2, respectively.

Grx1/2: Receive antenna gain at base stations 1 and 2, respectively.

Ftx1/2: Transmit feeder loss at base stations 1 and 2, respectively.

Frr1/2: Receive feeder loss at base stations 1 and 2, respectively.

Gmc1/2: Multi-coupler gain at base stations 1 and 2, respectively.

Ld1: Downlink pathloss in serving cell.
Ld2: Downlink pathloss in target cell.
Lu1: Uplink pathloss in serving cell.
Lu2: Uplink pathloss in target cell.

Of course, those skilled in the art will appreciate that base stations 1 and 2 include other features not illustrated in FIG. 6 to reduce complexity of the figure. Using these parameters, exemplary formulae for pathloss comparison are as follows.

Downlink Pathloss in serving cell is:

$$Ld1 = Pbs1 - Ftx1 + Gtx1 - SSms1$$

Downlink Pathloss in target cell is:

$$Ld2 = Pbs2 - Ftx2 + Gtx2 - SSms2$$

Uplink Pathloss in serving cell is:

$$Lu1 = Pms + Grx1 - Frx1 + Gmc1 - SSbs1$$

Uplink Pathloss in target cell is:

$$Lu2 = Pms + Grx2 - Frx2 + Gmc2 - SSbs2$$

Thus, the difference in downlink pathloss between the serving cell and the target cell is:

$$Ld1 - Ld2 = Pbs1 - Ftx1 + Gtx1 - SSms1 - Pbs2 + Ftx2 - Gtx2 + SSms2 \quad (1)$$

and the difference in uplink pathloss between serving cell and target cell is:

$$Lu1 - Lu2 = Pms + Grx1 - Frx1 + Gmc1 - SSbs1 - Pms - Grx2 + Frx2 - Gmc2 + SSbs2 \quad (2)$$

Assuming that the difference in downlink pathloss is equal to the difference in uplink pathloss gives:

$$Lu1 - Lu2 = Ld1 - Ld2$$

$$SSbs2 = SSbs1 + SSms2 - SSms1 + Pbs1 - Pbs2 + (Gmc2 - Gmc1) + (Grx2 - Gtx2 + Ftx2 - Frx2) + (Gtx2 - Grx1 + Frx1 - Ftx1)$$

Assuming that the gain in the multi coupler is the same in both cells, and that feeder loss and antenna gain is equal in the uplink and downlink path, the criteria for the consistency check can be formulated as:

$$SSbs2 = SSbs1 + SSms2 - SSms1 + Pbs1 - Pbs2 \quad (3)$$

The list below indicates exemplary ways in which these measurement values can be obtained in the system to implement a consistency check according to the present invention.

Pbs1/Pbs2 Information about base station output power can be taken from the cell parameters PSVB and PSMB determined during digital locating, for example, if they are defined as the output power at the COMB output.

SSms1/SSms2 Signal strength measured in and reported from the mobile is known by the base station and these values can be inserted into the handoff request signal from BS to MSC.

SSbs1 Signal strength received and measured in the serving base station.

SSbs2 Signal strength received and measured in the target base station.

Thus in implementing the consistency check, the MSC checks to see if the uplink signal strength measured in the target base station is greater than or equal to the right-hand side of equation (3) minus a safety margin which, for example, is applied to compensate for measurement errors and the like. That is, the MSC checks:

$$SSbs2 \geq SSbs1 + SSms2 - SSms1 + Pbs1 - Pbs2 - SSmargin \quad (4)$$

According to another exemplary embodiment of the present invention, equation (4) can be adapted to take into account the statistical variations in the bias error described, for example, in FIG. 5. Whereas in the previously described embodiment the SSmargin value of equation (4) is a constant, in the present embodiment SSmargin is a function of the stability of the error m as a function of time. When the value of m varies significantly, the margin allowed for approving a handoff is greater than if the value of m varies slightly. Thus the difference in uplink and downlink path loss, m, to the serving cell can be measured as:

$$m = (Pbs1 - Pms1) + (SSbs1 - SSms1) \quad (5)$$

Since m is theoretically zero absent measurement errors, any nonzero m is also an error value. The total error m is measured and stored for a number of samples to iteratively determine an error estimate E(m) as:

$$E(m) := g(m) + (m - E(m))/n \quad (6)$$

where n=the sample number.
The variance of E(m) is estimated as:

$$V(m) := ((n-1)/n) * V(m) + (n+1) * ((E(m) - m)/n)^2 \quad (7)$$

The standard deviation is then:

$$\sigma(m) = SQRT(V(m)) \quad (8)$$

In formula (4), according to the present embodiment, SSmargin will be replaced by a function, e.g., as follows:

$$SSmargin = E(m) - 2.3\sigma(m)$$

For this particular example, the margin is set to avoid 95% (2.3 σ) of the bias errors which could otherwise skew the result. Of course, those skilled in the art will recognize that other multiplicands for sigma could be used to achieve higher or lower probabilities as desired.

According to another exemplary embodiment of the present invention an alternative exemplary formula for pathloss comparison is as follows.

$$Ld1-Lu1=Ld2-Lu2 \quad (9)$$

which indicates that, assuming no errors in the base stations, the difference between downlink and uplink pathloss should be the same for the path between the mobile station and the serving base station on one side and the mobile station and the target base station on the other side, because the inaccuracies in the mobile station both regarding measuring equipment and transmission levels are the same on both sides of the equation.

If equation (9) is not satisfied the reason is that the signals considered include cochannel radio energy or other disturbances and that the planned handoff should be disallowed. A certain inequality should be allowed in equation (9) for the errors caused by the serving and target base stations, but this inequality can be relatively small, e.g., 2 dB, and acts as a predefined threshold. This threshold may be different depending on which target cell is under consideration or even which particular target and the serving cells are being considered. The threshold may also vary with time depending on the variance of associated signals. The threshold is still predefined in the sense that at the time of the consistency check it is known.

The above-described exemplary embodiments are intended to be illustrative in all respects, rather than restrictive, of the present invention. For example, although the illustrative embodiments have been described in terms of mobile stations, any type of remote station in any type of radiocommunication system (e.g., PCS, wireless modems, personal digital assistants, etc.) will benefit from the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A method for confirming an identity of a target cell for handoff from a digital traffic channel in a digital cellular mobile telephone system, said system including a serving base station which transmits with a first power level, a target base station which transmits with a second power level and a mobile station which transmits with a third power level and communicates via a radio connection with the serving base station, comprising the steps of:

measuring a first pathloss in an uplink direction and a first pathloss in a downlink direction of the radio connection between said serving base station and said mobile station;

forming a difference between said first pathlosses in the uplink and downlink direction of the radio connection between said serving base station and said mobile station, thereby obtaining a first total error;

measuring a second pathloss in an uplink direction and a second pathloss in a downlink direction of a radio path between said target base station and said mobile station;

forming a difference between said second pathlosses in the uplink and downlink direction of the radio path between said target base station and said mobile station, thereby obtaining a second total error;

calculating a difference between said first and second total error;

comparing said difference between said first and second total error with a predetermined threshold; and confirming identity of said target cell when said difference does not exceed said threshold.

2. A method for confirming an identity of a target cell for handoff from a digital traffic channel in a digital cellular mobile telephone system, said system including a serving base station which transmits with a first power level, a target base station which transmits with a second power level and a mobile station which transmits with a third power level and communicates via a radio connection with the serving base station, comprising the steps of:

measuring first and second pathlosses in an uplink direction and in a downlink direction, respectively, of the radio connection between said serving base station and said mobile station;

forming a difference between said first and second pathlosses in the uplink and downlink direction of the radio connection between said serving base station and said mobile station, thereby obtaining a value of a total error related to said mobile station;

measuring a third pathloss in a downlink direction of a radio path between said target base station and said mobile station;

calculating an expected fourth pathloss in the uplink direction of the radio path between said target base station and said mobile station from said measured third pathloss and said total error;

determining an expected received signal strength of a signal transmitted from said mobile station and received in said target base station from said expected fourth pathloss and said third power level;

measuring a received signal strength of a signal transmitted from said mobile station and received in said target base station;

comparing the value of said expected received signal strength and said measured received signal strength; and confirming the identity of said target cell when said measured received signal strength is greater than said expected received signal strength minus a safety margin.

3. A method as claimed in claim 2 wherein the safety margin is a constant.

4. A method as claimed in claim 2 wherein the safety margin is a function of a statistical variance relating to at least one of said steps of measuring.

5. A method for handing over communication with a remote station from a first base station to a second base station comprising the steps of:

determining an uplink and a downlink pathloss for each of said first and second base stations relative to said mobile station from known transmission signal strengths and received signal strengths;

calculating an expected received signal strength in said second base station of signals generated by said mobile station based on said signal strengths and pathlosses from said step of determining;

confirming said second base station as an appropriate handoff candidate based on a comparison between said expected signal strength and a measured signal strength associated with signals generated by said mobile station and received by said second base station; and handing over said communication based on the result of said confirming step.

6. The method of claim 5, wherein said step of confirming further comprises:

including a safety margin in said comparison.

7. The method of claim 6, wherein said safety margin is based on a standard deviation of bias errors.

8. A method for handing over communication with a remote station from a first base station to a second base station comprising the steps of:

determining if the inequality $SSbs2 \geq SSbs1+SSms2-SSms1+Pbs1-Pbs2-SSmargin$ is true; and handing over communication to the second base station based upon a result of said determining step.

* * * * *